US011353719B2

(12) United States Patent
McGinley et al.

(10) Patent No.: US 11,353,719 B2
(45) Date of Patent: **\*Jun. 7, 2022**

(54) MODULAR EYEGLASS FRAME SYSTEMS AND METHODS FOR THEIR USE AND MANUFACTURE

(71) Applicants: Sean McGinley, Providence Forge, VA (US); Matthew Proffitt, Providence Forge, VA (US); Michael Broz, Providence Forge, VA (US)

(72) Inventors: Sean McGinley, Providence Forge, VA (US); Matthew Proffitt, Providence Forge, VA (US); Michael Broz, Providence Forge, VA (US)

(73) Assignee: Klix Frames (USA) LLC, Portland, OR (US)

( \* ) Notice: Subject to any disclaimer, the term of this patent is extended or adjusted under 35 U.S.C. 154(b) by 163 days.

This patent is subject to a terminal disclaimer.

(21) Appl. No.: 15/954,514

(22) Filed: Apr. 16, 2018

(65) Prior Publication Data

US 2018/0231796 A1 Aug. 16, 2018

Related U.S. Application Data

(63) Continuation of application No. 15/019,858, filed on Feb. 9, 2016, now Pat. No. 9,983,415.

(51) Int. Cl.
*G02C 1/06* (2006.01)
*G02C 13/00* (2006.01)

(52) U.S. Cl.
CPC ............. *G02C 1/06* (2013.01); *G02C 13/001* (2013.01); *G02C 2200/02* (2013.01); *G02C 2200/08* (2013.01)

(58) Field of Classification Search
CPC ... G02C 5/02; G02C 5/10; G02C 5/20; G02C 5/22; G02C 5/229; G02C 5/2281;
(Continued)

(56) References Cited

U.S. PATENT DOCUMENTS

2003/0223032 A1\* 12/2003 Gagnon .................... G02C 1/08
351/92
2009/0051866 A1\* 2/2009 DiChiara ................. G02C 1/04
351/110

OTHER PUBLICATIONS

U.S. Appl. No. 15/019,858, filed Aug. 10, 2017, Sean McGinley, Matt Proffitt, Michael Broz.
(Continued)

*Primary Examiner* — Mustak Choudhury
(74) *Attorney, Agent, or Firm* — Dascenzo Gates Intellectual Property Law, P.C.

(57) ABSTRACT

Modular eyeglass frame system and methods for their use and manufacture. Exemplary frame systems include an eyeglass frame base having a top edge, a removable element having a top edge that substantially matches the top edge of the frame base, and one or more attachment elements operative to removably attach the removable element to the frame base. The frame base includes a first channel and a second channel suitable for partially enclosing a first lens and a second lens; and the removable element includes a first channel and a second channel, each removable element channel being configured such that when the removable element is attached to the frame base, the first and second channels of the frame base align with the first and second channels of the removable element to fully enclose a periphery of the first lens and the second lens. The one or more attachment elements secure the removable element to the frame base such that the two-piece frame system is substantially as durable as a solid one-piece frame.

20 Claims, 4 Drawing Sheets

(58) Field of Classification Search
CPC ........ G02C 13/001; G02C 2200/02–22; G02C 1/06; G02C 1/08; G02C 9/00; G02C 7/12; C03C 4/0071; C03C 3/062; C03C 3/125; A45C 11/04; A45F 5/021
USPC ............... 351/41, 47, 49, 57, 58, 83, 85, 86, 351/91–107, 110, 178, 219, 221, 231
See application file for complete search history.

(56) References Cited

OTHER PUBLICATIONS

Klix Frames (USA) LLC website: https://www.klixframesusa.com/how-it-works.

\* cited by examiner

MODULAR EYEGLASS FRAME SYSTEMS AND METHODS FOR THEIR USE AND MANUFACTURE

RELATED APPLICATIONS

This continuation patent application claims priority to, and the benefit of, U.S. application Ser. No. 15/019,858, entitled "Eyeglass Frame System Where Lenses Can Move From One Frame to Another" and filed on Feb. 9, 2016, the entire contents of which are incorporated by reference as though fully described herein.

TECHNICAL FIELD

This continuation patent application generally relates to eyeglass frames and lenses, and more specifically to eyeglass frame systems and methods that allow a consumer to apply one set of prescription lenses to a variety of eyeglass frames.

BACKGROUND

Many consumers who wear prescription eyeglasses to correct a vision problem are bound to wearing a specific eyeglass frame comprising a pair of prescription lenses. Without a simple way to interchange lenses and frames, consumers are limited to wearing the same pair of eyeglasses every day—or, alternatively, buying multiple complete pairs of prescription eyeglasses. However, because prescription lenses are often very expensive, particularly high-index lenses for stronger prescriptions, the latter option may be cost-prohibitive for many consumers. Conventional methods for using the same pair of lenses with different eyeglass frames have done little or nothing to solve this problem for consumers.

Conventionally, prescription lenses are installed in eyeglass frames by an optician, optometrist, or other eyewear professional, and it is difficult for consumers to remove these lenses once they are disposed in the frames. Thus, consumers are generally required to schedule an appointment at an optometrist's office in order to replace their lenses or eyeglass frames. However, it can be frustrating, time-consuming, and expensive to wait for an appointment and travel to the optometrist's office—or to mail the eyeglasses in for lens-replacement service and wait for return shipping. Additionally, once removed, the lenses may not fit properly into different eyeglass frames. That is, the lenses may be too large, too small, or the wrong shape for the new frames, thereby requiring an optician to cut down the lenses and/or re-shape the frames. And, once the lenses are cut down, it may be impossible to reinsert the lenses into the original frames.

Due to the hassle and cost of conventional systems and methods, many consumers attempt to complete the lens replacement process themselves, which often results in broken or bent eyeglass frames due to their fragile construction. Other consumers choose to purchase multiple complete pairs of prescription eyeglasses in different styles and colors, but comprising the same prescription. However, it is extremely expensive to continually purchase new eyeglass frames and lenses to coordinate with certain outfits, replace broken frames, or simply keep up with style trends from year to year. There is no known system or method for a consumer to easily move lenses between different sets of eyeglass frames, or to swap lenses in and out of the same pair of eyeglass frames.

Accordingly, there exists a need for systems and methods that allow a consumer to easily swap their lenses and/or eyeglass frames, without the hassle, risk of damage, waiting times, frustration, or expense of conventional systems and methods.

SUMMARY

The present teachings disclose modular eyeglass frame systems and methods for their use and manufacture. The disclosed systems and methods allow consumers to own and utilize multiple eyeglass frames suitable for housing a single set of prescription lenses, and/or to own and utilize multiple sets of lenses suitable for use in the same eyeglass frames. The frame systems are "modular" in that they enable a single pair of prescription lenses to be easily interchangeable with the same or different eyeglass frames. This kind of versatility allows consumers to conveniently replace their own broken eyeglass frames at home and/or to wear different colors and/or styles of eyeglass frames for aesthetic reasons. More specifically, the disclosed systems provide consumers a way to take their single pair of prescription lenses out of a first eyeglass frame, and place them into a second eyeglass frame—sometimes having a different color and/or style. By lifting a removable horizontal bar from a rear of the frame, the lenses easily slide out of the first eyeglass frame and easily slide into the second eyeglass frame.

In some embodiments, an exemplary method for interchanging lenses between eyeglass frames includes a step of providing at least one modular eyeglass frame system including an eyeglass frame base having a top edge, a removable element having a top edge that substantially matches the top edge of the frame base, and one or more attachment elements operative to removably attach the removable element to the frame base. In such embodiments, the frame base includes a first channel and a second channel suitable for partially enclosing a first lens and a second lens. Additionally, in such embodiments, the removable element includes a first channel and a second channel, configured such that when the removable element is attached to the frame base, the first and second channels of the frame base align with the first and second channels of the removable element to fully enclose a periphery of the first lens and the second lens.

In some embodiments, the method further includes the steps of providing the first lens and the second lens; removing the removable element from the frame base; placing the first lens into the frame base such that the first channel of the frame base partially encloses the periphery of the first lens; placing the second lens into the frame base such that the second channel of the frame base partially encloses the periphery of the second lens; and replacing the removable element onto the frame base such that the first and second channels of the removable element align with the first and second channels of the frame base to thereby fully enclose the peripheries of the first lens and the second lens. In some embodiments, the at least one eyeglass frame system may include a first frame system and a second frame system, wherein the first lens and the second lens may be configured to be interchangeable between the first frame system and the second frame system.

Additionally, or alternatively, some embodiments may include a third lens and a fourth lens, each lens being configured to fit within the at least one frame system. In some embodiments, the third lens may be interchangeable with the first lens, and the fourth lens may be interchangeable with the second lens such that the same eyeglass frame may support different pairs of lenses. Embodiments may include any number of lenses suitable for use within any number of frame bases, said lenses and frame bases being interchangeable for any desired purpose. In some embodiments, the method may further include a step of securing the removable element into the frame by an attachment means—such as, for example, one or more magnets, spring clips, locking pins, rubber nipples, snap-fit joints, and/or any other suitable means—to securably attach the removable element to a back region of the frame base. In some embodiments, the method may further include a step of removing a set of lenses from the frame base prior to placing the first lens and the second lens into the frame base.

In some embodiments, an exemplary method for manufacturing a modular eyeglass frame system includes the steps of forming an eyeglass frame base having a top edge; forming a first channel and a second channel of the frame base, the first frame base channel being configured to partially enclose a first lens, and the second frame base channel being configured to partially enclose a second lens; forming a removable element having a top edge that substantially matches the top edge of the frame base, such that the removable element is suitable for attachment to the frame base; and forming a first channel and a second channel of the removable element, each removable element channel being configured such that when the removable element is attached to the frame base, the first and second channels of the frame base align with the first and second channels of the removable element to fully enclose a periphery of the first lens and the second lens.

Some embodiments may further include a step of disposing one or more attachment elements on the frame base and/or removable element, each attachment element being configured to securably attach the removable element to the frame base. In some embodiments, one or more attachment elements may be magnet(s), spring clip(s), locking pin(s), rubber nipple(s), or any other suitable attachment means or combination thereof. In some embodiments, the removable element may be configured to be attachable to a back region of the frame base. In such embodiments, the frame base may be formed to include a bridge section such that the removable element is attachable to the back region of the frame base above the bridge section. Additionally, some embodiments may include a step of providing a release element configured to assist in separating the removable element from the frame base. In some embodiments, the frame base and/or removable element may be made of a material, or mixture of materials such as, but not limited to, metal or plastic.

BRIEF DESCRIPTION OF THE DRAWINGS

Without restricting the full scope of the disclosure, a preferred embodiment of the present teachings is illustrated in the following drawings, in which.

DETAILED DESCRIPTION

Various embodiments of modular eyeglass frame systems and methods for their use are described below and shown in the associated drawings. Unless otherwise specified, the disclosed eyeglass frame systems and methods for their use may, but are not required to, contain at least one of the structure, components, steps, functionality, and variations described or shown herein. The following description of various embodiments is merely exemplary in nature and is in no way intended to limit the disclosure, its application, or uses. Additionally, the advantages provided by the embodiments, as described below, are illustrative in nature and not all embodiments provide the same advantages or the same degree of advantages.

1. Systems

Figure 1:
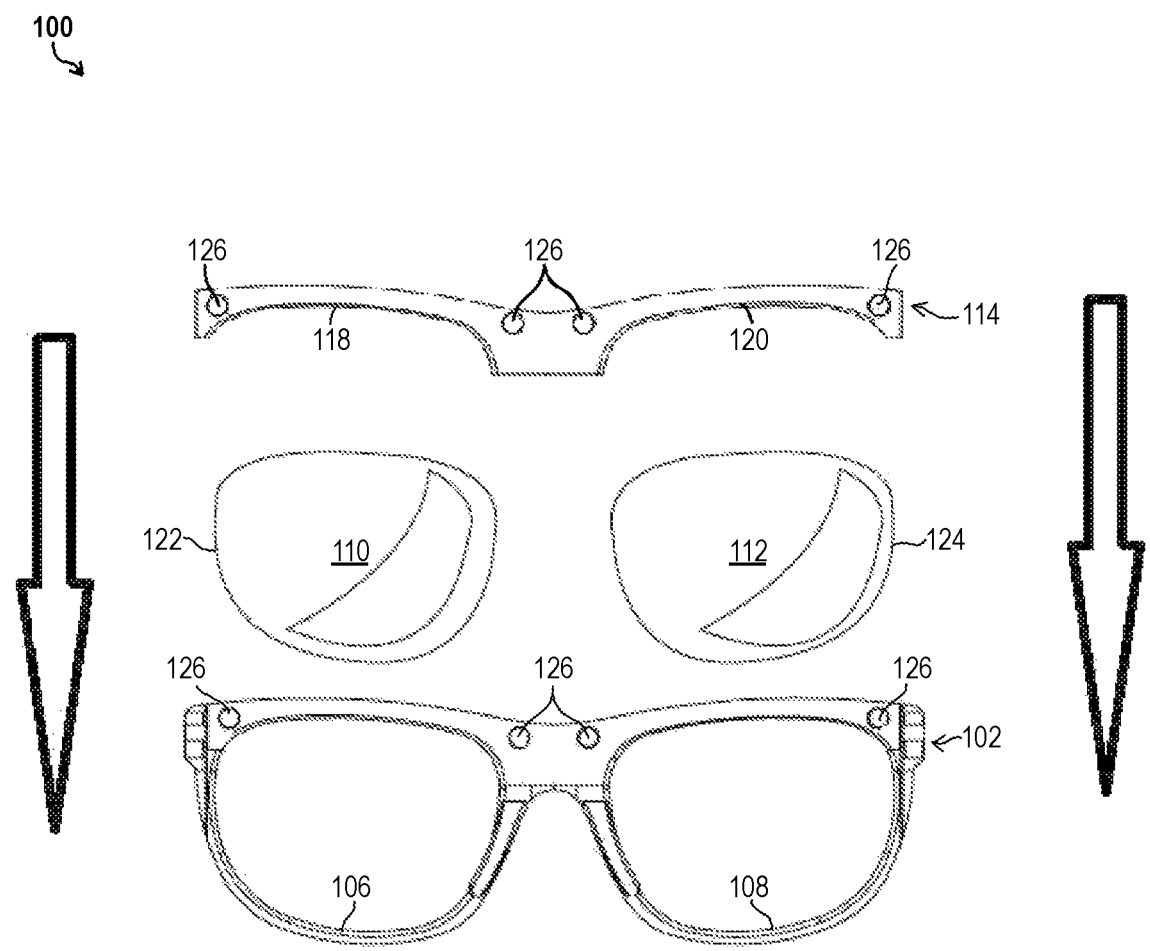
FIG. 1 is an illustration showing a front view of numerous components of a modular eyeglass frame system, according to aspects of the present teachings.
Figure 2:
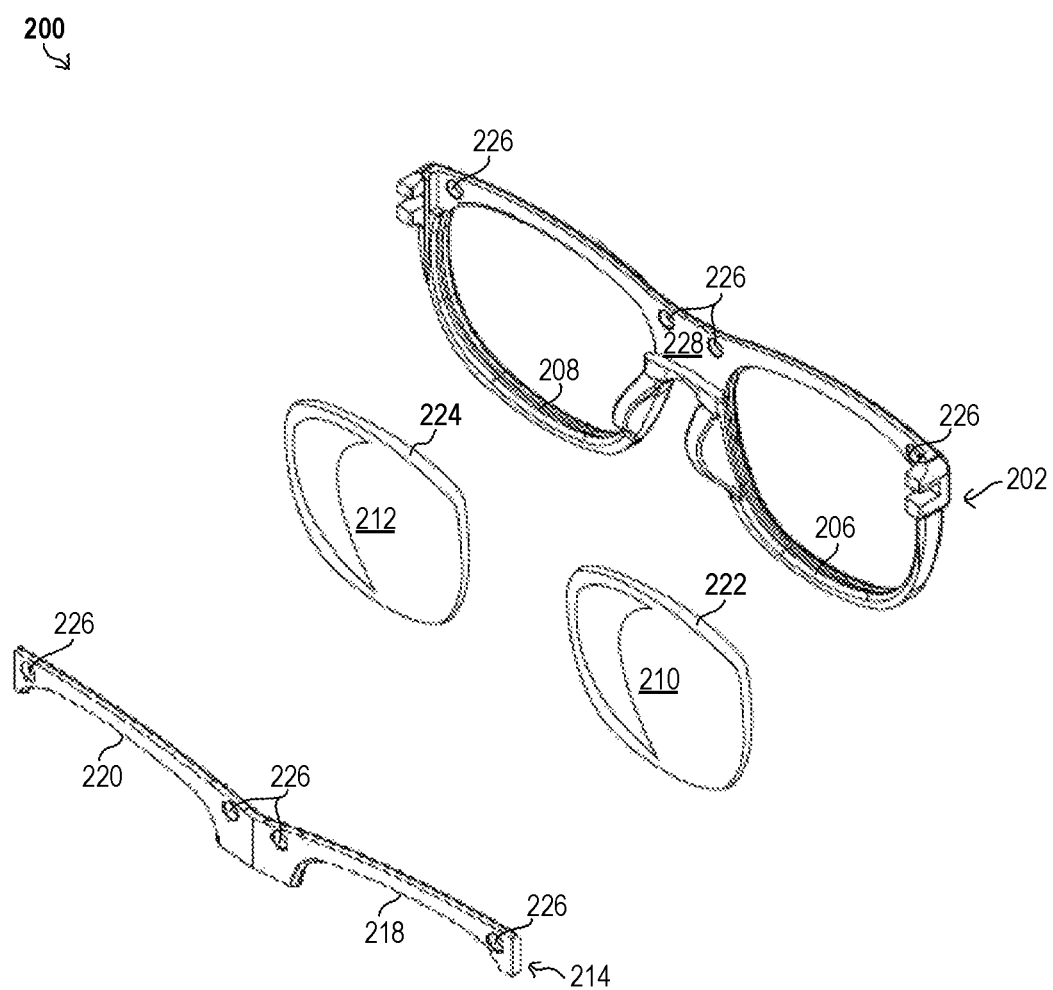
FIG. 2 is an illustration showing a rear perspective view of the components of the eyeglass frame system of FIG. 1, according to aspects of the present teachings.

This section describes general features of modular eyeglass frame systems, according to aspects of the present teachings; see FIGS. 1-2.

The disclosed systems and methods are intended to allow consumers of eyewear to purchase one set of prescription or non-prescription lenses and utilize them in a variety of other eyeglass frames, and/or to purchase a variety of interchangeable lenses and utilize them the same eyeglass frame. Because prescription lenses are often the most expensive component to a pair of complete eyeglasses, the disclosed systems and methods may provide an economic advantage for consumers who use the same pair of prescription lenses for multiple sets of eyeglass frames. Examples of such uses include, without limitation: replacing a broken set of eyeglass frames and/or simply switching up their look by changing the shape, style, and/or color of their eyeglass frames. And, because designer eyeglass frames can also be extremely expensive, consumers may additionally—or alternatively—desire to use different interchangeable lenses in the same eyeglass frame. For example, a consumer may use polarized lenses when outdoors in bright sunlight, and then swap the polarized lenses out for clear lenses after heading indoors.

FIG. 1 a photograph showing a front view of a modular eyeglass frame system 100 suitable for at least the above-contemplated uses, according to aspects of the present teachings. As shown in FIG. 1, the frame system 100 includes a frame base 102 having a top edge 104, a first channel 106, and a second channel 108. The first channel 106 is suitable for partially enclosing a first lens 110, and the second channel 108 is suitable for partially enclosing a second lens 112. Additionally, the frame system 100 includes a removable element 114 (which may more specifically be referred to as a "horizontal top bar") having a top edge 116 that substantially matches the top edge 104 of the frame base 102. Typical eyeglass frame materials include, without limitation: plastic, nylon, cellulose acetate, aluminum, titanium, metal alloys, carbon fiber, wood, and stainless steel. However, the frame base 102 and removable element 114 may consist of any material or mixture of materials suitable for being worn on the face of a user.

The removable element 114 further includes a first channel 118 and a second channel 120, each corresponding to a respective first channel 106 or second channel 108 of the frame base. That is, when the first channel 118 and the second channel 120 of the removable element 114 is attached to the frame base 102, the channels 118 and 120 of the frame base 102 align with the channels 106 and 108 of the removable element 114 as to fully enclose a first periphery 122 of the first lens 110 and a second periphery 124 of the second lens 112. As indicated by the two downward-pointing in FIG. 1, the lenses 110 and 112 are configured to slide downward into the frame base 102, and the removable element 114 is configured to be securably attached to the frame base 102 such that the removable element's top edge 116 aligns with the frame base's top edge 104 to thereby fully enclose the peripheries 122 and 124 of the lenses 110 and 112.

In preferred embodiments, the frame base 102, lenses 112 and 124, and removable element 114 are secure and stable in relation to each other such that there is little to no risk of these components becoming loose during normal physical activities. In fact, preferred embodiments of the frame system 100 are no less sturdy than a solid eyeglass frame made of one substantially contiguous piece. Accordingly, some embodiments may include one or more attachment elements 126 configured to removably secure the removable element 114 onto the frame base 102. The attachment element(s) 126 may include, for example, magnets (neodymium or otherwise), spring clips, locking pins, rubber nipples, snap-fit joints, and/or any other suitable means for securably and removably attaching the removable element 114 to the frame base 102. For example, as shown in FIG. 1, the attachment element(s) 126 may be a plurality of neodymium magnets disposed along the removable element 114 and a top portion of the frame base 102. However, not all embodiments may include magnets. And, in some embodiments, the attachment element(s) 126 may be at least substantially hidden from view as to avoid being cumbersome and/or interfering with a consumer's range of vision.

FIG. 2 is an illustration showing a rear perspective view of the components of the eyeglass frame system 200 of FIG. 1, according to aspects of the present teachings. For simplicity, the numbering of FIG. 2 corresponds to the numbering in FIG. 1, except the elements of FIG. 2 begin with the number "2" instead of the number "1." As shown in FIG. 2, certain embodiments of the frame system 200 may include a back region 228 of the frame base 202. In such embodiments, the removable element 214 may be securably attached to the back region 228 by the attachment mean(s) 226. In preferred embodiments, the removable element 214 should be easily detachable from the back region 228 upon a minimal application of pressure so that the lenses 210 and 212 may be pulled up and away from the channels 206 and 208 of the frame base 202. The removable element 214 may then be replaced on the frame base 202 by positioning the removable element 214 along the back region 228. For embodiments wherein the attachment means 226 are magnets, the magnets will then pull the removable element 214 into proper alignment. Thus, some—but not all—embodiments may provide for self-guidance when replacing the removable element 214.

2. Methods

The following sections describe selected aspects of modular eyeglass frame systems and methods for their use and manufacture. The examples in these sections are intended for illustration and should not be interpreted as limiting the entire scope of the present disclosure. Each section may include one or more distinct inventions, functions, and/or steps. Additionally, although each step is described as a "first," "second," "third," etc., a consumer may perform the steps in any suitable order, and some steps may be performed simultaneously with others or repeated as desired.

A. Methods of Use

Figure 3:
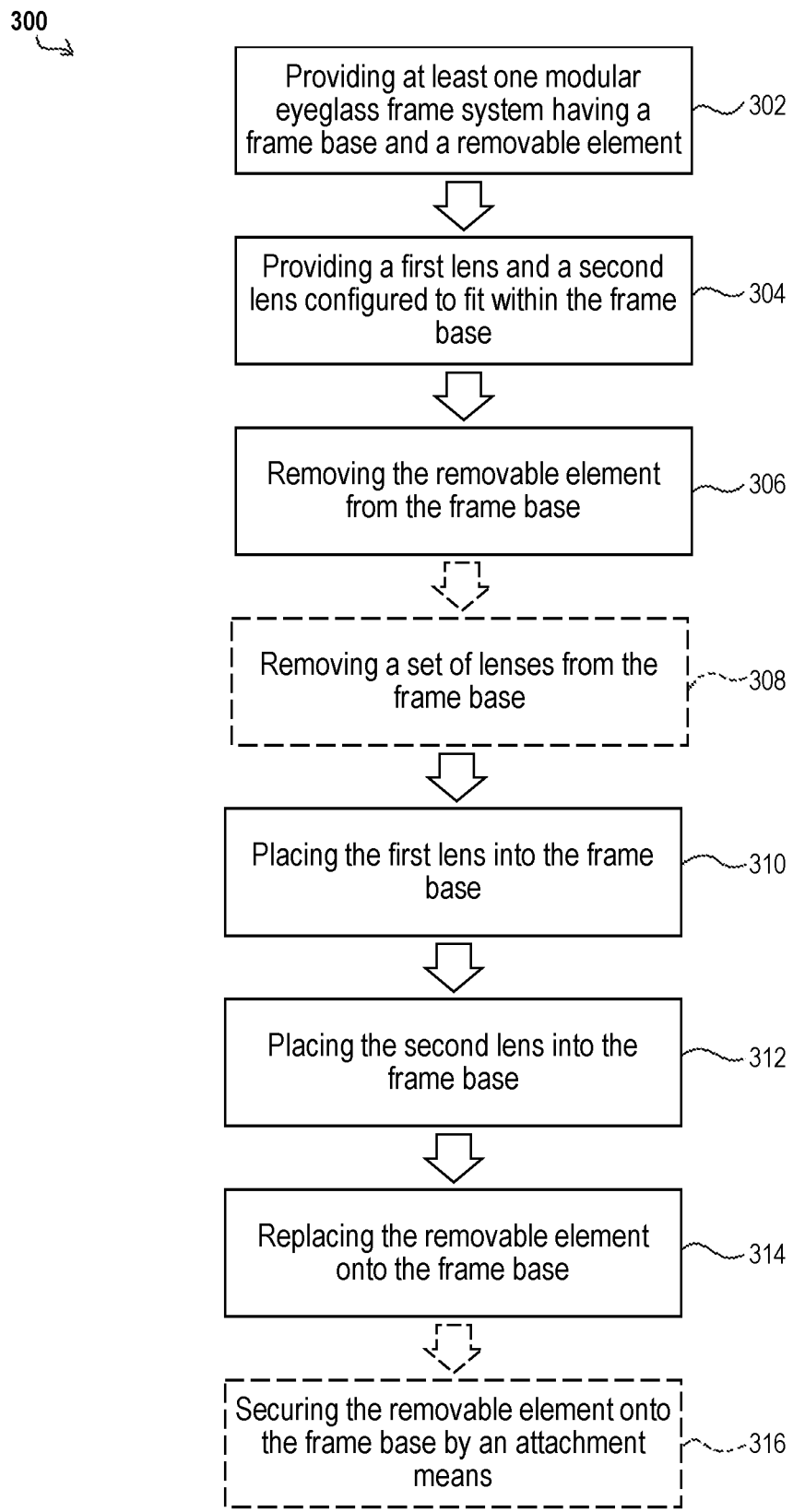
FIG. 3 is a flowchart showing an exemplary method for interchanging lenses between eyeglass frames, according to aspects of the present teachings.

This section describes exemplary methods of interchanging lenses between eyeglass frames, according aspects of the present teachings; see FIG. 3.

FIG. 3 is a flowchart showing an exemplary method 300 for using modular eyeglass frame systems, according to aspects of the present teachings. The elements used in each step of the method 300 may include substantially the same features, advantages, and benefits as described with respect to FIGS. 1-2. Thus, to avoid repetition, the features will not be described again in this section. As shown in FIG. 3, the method 300 includes a first step 302 of providing at least one modular eyeglass frame system having a frame base and a removable element. The method 300 further includes a second step 304 of providing a first lens and a second lens configured to fit within the frame base; and a third step 306 of removing the removable element from the frame base. In some embodiments, the method 300 may include an optional fourth step 308 of removing a different set of lenses from the frame base before a fifth step 310 of placing the first lens into the frame base such that the first channel of the frame base partially encloses periphery of the first lens.

The method 300 next includes a sixth step 312 of placing the second lens into the frame base such that the second channel of the frame base partially encloses the periphery of the second lens. The lenses may be placed into the frame base in any order, or simultaneously. Additionally, as shown in FIG. 3, the method 300 may further include a seventh step 314 of replacing the removable element onto the frame base such that the first and second channels of the removable element align with the first and second channels of the frame base to thereby fully enclose the periphery of the first lens and the second lens. The method 300 may further include an optional eighth step 316 of securing the removable element onto the frame base by an attachment means. In preferred embodiments, the seventh step 314 and the eighth step 316 may be performed at substantially the same time to provide a seamless user experience. For example, in some embodiments, the removable element may "click" or pull into place when properly positioned on the frame base.

The steps of the method 300 may be repeated as desired, and not necessarily in the same order or to the same degree of completion. For example, some embodiments may further include providing a third lens and a fourth lens that are each configured to fit within the frame base, wherein the third lens is interchangeable with the first lens, and the fourth lens is interchangeable with the second lens. In other words, more than one pair of lenses may be provided so that consumers may interchange their lenses as often as they desire. Situations in which it may be desirable to interchange one or more lenses using the same eyeglass frame include, for example: swapping out a scratched lens for a pristine replacement lens, switching between polarized and non-polarized lenses depending on lighting conditions, switching between lenses that correct for myopia and hyperopia, and/or switching out an old prescription for a new prescription when eyes worsen.

Additionally, some embodiments may include a step of providing one or more additional frame systems, wherein the first lens and the second lens (or any number of additional compatible lenses) are interchangeable between a multitude of frame systems. In other words, more than one set of eyeglass frames may be provided so that consumers may interchange their frames while using the same pair of prescription or non-prescription lenses. Situations in which it may be desirable to use different sets of eyeglass frames with the same pair of lenses include, for example: changing the color, style, shape, and/or overall look of the frame for aesthetic reasons; and/or replacing an old or broken eyeglass frame. Additionally, consumers may mix and match individual frame systems such that the frame base consists of a different color and/or material than the removable element, allowing for a multitude of unique color and style combinations while wearing a single pair of glasses (e.g., an acetate frame base attached to a titanium removable bar, or vice versa).

B. Methods of Manufacturing

Figure 4:
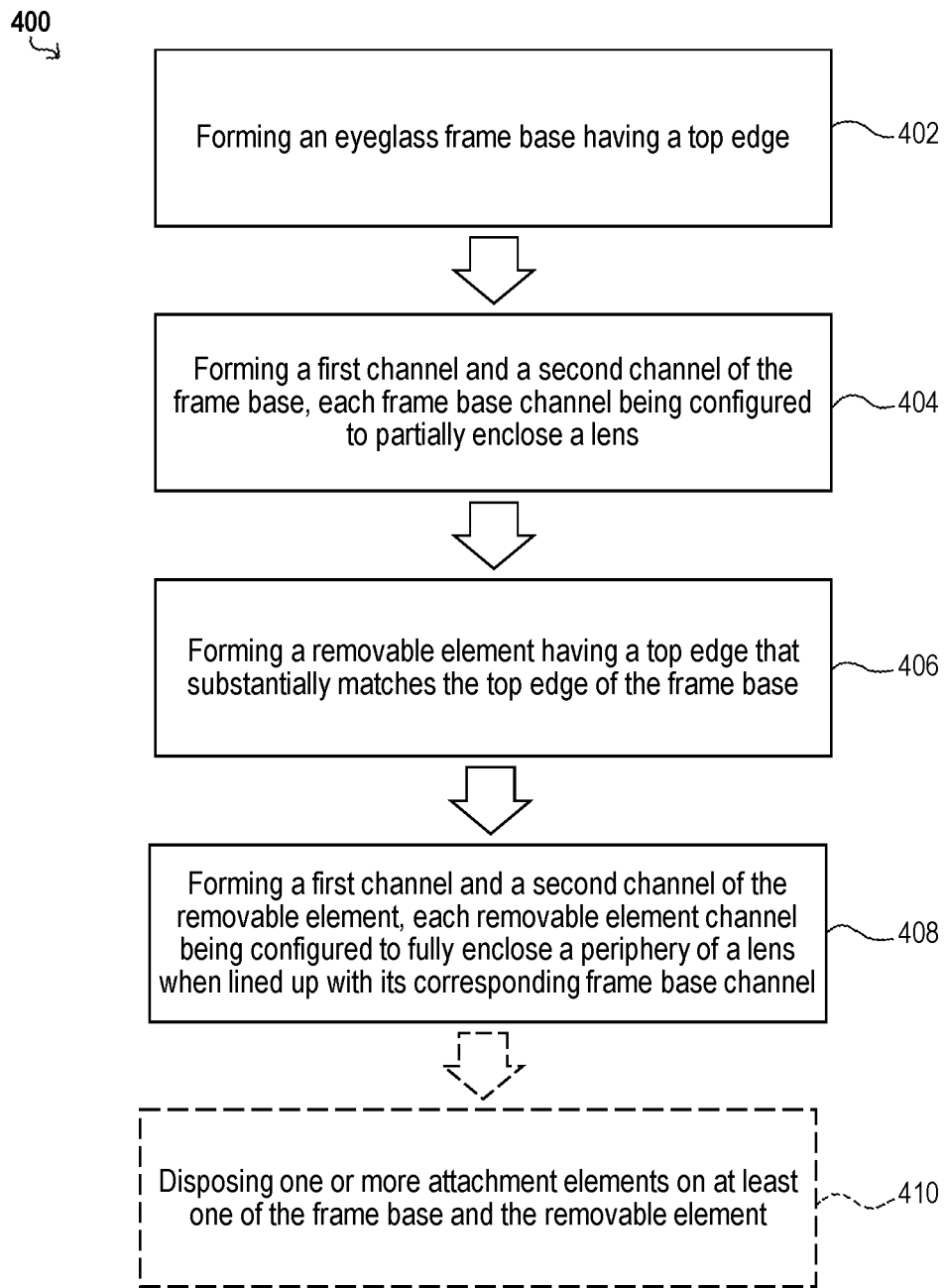
FIG. 4 is a flowchart showing an exemplary method for manufacturing a modular eyeglass frame system, according to aspects of the present teachings.

This section describes exemplary methods of manufacturing eyeglass frame systems, according to aspects of the present teachings; see FIG. 4.

FIG. 4 is a flowchart showing an exemplary method for manufacturing a modular eyeglass frame system, according to aspects of the present teachings. The elements used in each step of the method 400 may include substantially the same features, advantages, and benefits as described with respect to FIGS. 1-2. Thus, to avoid repetition, these elements are will not be described again in this section. As shown in FIG. 4, the method 400 includes a first step 402 of forming an eyeglass frame base having a top edge; and a second step 404 of forming a first channel and a second channel of the frame base, each frame base channel being configured to partially enclose a lens. Next, the method 400 includes a third step 406 of forming a removable element having a top edge that substantially matches the top edge of the frame base; and a fourth step 408 of forming a first channel and a second channel of the removable element, each removable element channel being configured to fully enclose a periphery of a lens when lined up with its corresponding frame base channel. The frame base and removable element may be made from plastic, metal, wood, and/or any other suitable material(s).

Additionally, the frame base and removable element may be handcrafted, machine-made, injection molded, additively manufactured, and/or formed using any other suitable process. High-end eyeglass frames are typically handcrafted, but cheaper methods of manufacturing may be utilized as well. In some embodiments, different components of an individual frame system may be manufactured using different methods. For example, a consumer may originally purchase a frame system having a frame base and the removable element that both consist of the same cellulose acetate material. However, if the consumer damages or misplaces the removable element and requires an immediate replacement, the consumer may design or download a 3D model for additively manufacturing a temporary (or permanent) replacement for the removable element. Some manufacturers may even provide an online database of 3D models for this very purpose.

In some embodiments, the method 400 may further include a fifth optional step 410 of disposing one or more attachment elements on the frame base and/or the removable element. In some embodiments, the fifth step 410 may be performed at substantially the same time as the first step 402 and/or the second step 404. Additionally, the attachment elements may be made from the same or a different material (or mixture of materials) as the frame base and/or the removable element. For example, in embodiments wherein the attachment elements are snap-fit joints, the snap-fit joints may be injection-molded or additively manufactured at the same time as the frame base and/or removable element. Alternatively, in embodiments wherein the attachment elements are neodymium magnets, the magnets may be disposed on the frame base and/or removable element after the frame base and removable element are substantially formed. Additionally, some embodiments may include two or more different types of attachment elements, such as one or more rubber nipples in the center area of the frame base and removable element, and one or more magnets in the end areas of the frame base and removable element.

Manufacturing of the frame system may be deemed complete when the frame base and removable element are properly formed, and the one or more attachment elements are properly disposed thereon. However, other embodiments of the method 400 may further include a step of providing the first lens and the second lens, each lens being configured to fit within respective channels of the frame base. The lenses may consist of glass, CR-39 plastic, Trivex®, Tribrid™, polycarbonate, and/or high-index plastic. Preferred embodiments may provide high-index lenses due to their thinness and lightness, to optimize user comfort and minimize any potential "coke bottle glasses" effect. The lenses may further include any number of treatments such as, but not limited to, anti-scratch, anti-reflective, anti-fog, UV-blocking, and/or photochromic coatings.

Advantages, Features, Benefits

The different embodiments of modular eyeglass frame systems and methods for their use and manufacture described herein may provide several advantages over previous systems and methods. Specifically, the illustrative embodiments described herein provide efficient and consumer-friendly solution for the problem of lenses not being easily interchangeable between different eyeglass frames. For example, some embodiments allow for consumers to easily take their single pair of prescription lenses out of a first eyeglass frame, and place them into a second eyeglass frame having a different color and/or style. Other embodiments allow for consumers to easily swap out an old and scratched pair of prescription lenses for a new and pristine pair of prescription lenses, while utilizing the same eyeglass frame. In other words, consumers can mix and match lenses and/or eyeglass frames as desired.

No known systems or methods can produce these results. Thus, the illustrative embodiments described herein are particularly useful for consumers who desire durable and versatile eyewear, while minimizing the hassle, expense, risks, and frustration generally associated with exchanging lenses and/or eyeglass frames. However, not all embodiments described herein provide the same advantages or the same degree of advantage.

CONCLUSION

The foregoing disclosure may encompass multiple distinct inventions with independent utility. Although each of these inventions has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only, and do not constitute a characterization of any claimed invention. The subject matter of the invention(s) includes all novel and nonobvious combinations and subcombinations of the various elements, features, functions, and/or properties disclosed herein. The following claims particularly point out certain combinations and subcombinations regarded as novel and nonobvious. Invention(s) embodied in other combinations and subcombinations of features, functions, elements, and/or properties may be claimed in applications claiming priority from this or a related application. Such claims, whether directed to a different invention or to the same invention, and whether broader, narrower, equal, or different in scope to the original claims, also are regarded as included within the subject matter of the invention(s) of the present disclosure.

What is claimed is:

1. A method for interchanging lenses between eyeglass frames, comprising:
   providing a first lens and a second lens;
   providing at least one modular eyeglass frame system including:
      a frame base having a top edge, the frame base including a first channel and a second channel for partially enclosing the first lens and the second lens;
      a removable element including a first channel and a second channel, the removable element first and second channels being configured such that, when the removable element is attached to the frame base with the first lens received in the first channel of the frame base and with the second lens received in the second channel of the frame base, the removable element engages each of the first lens and the second lens, and the first and second channels of the frame base align with the first and second channels of the removable element to enclose a periphery of the first lens and a periphery of the second lens; and
      one or more attachment elements operative to removably attach the removable element to the frame base;
   placing the first lens into the frame base such that the first channel of the frame base partially encloses the periphery of the first lens;
   placing the second lens into the frame base such that the second channel of the frame base partially encloses the periphery of the second lens; and
   placing the removable element onto the frame base such that the first and second channels of the removable element align with the first and second channels of the frame base to thereby enclose the periphery of the first lens and the periphery of the second lens.

2. The method of claim 1, further comprising securing the removable element onto the frame base with the one or more attachment elements; and wherein the one or more attachment elements include one or more magnets.

3. The method of claim 2, wherein the one or more attachment elements include a plurality of magnets; and wherein the securing the removable element onto the frame base includes aligning the removable element with the frame base at least partially automatically with the plurality of magnets.

4. The method of claim 1, further comprising one or both of:
   (i) prior to the placing the first lens into the frame base, removing a third lens from the first channel of the frame base; wherein the first lens and the third lens have different optical characteristics; and
   (ii) prior to the placing the second lens into the frame base, removing a fourth lens from the second channel of the frame base; wherein the second lens and the fourth lens have different optical characteristics.

5. The method of claim 4, wherein one or both of:
   the removing the third lens from the first channel of the frame base includes sliding the third lens upward out of the first channel of the frame base from the top edge of the frame base; and
   (ii) the removing the fourth lens from the second channel of the frame base includes sliding the fourth lens upward out of the second channel of the frame base from the top edge of the frame base.

6. The method of claim 1, wherein the placing the first lens into the frame base includes sliding the first lens downward into the first channel of the frame base from the top edge of the frame base, and wherein the placing the second lens into the frame base includes sliding the second lens downward into the second channel of the frame base from the top edge of the frame base.

7. A modular eyeglass frame system, comprising:
   a frame base having a top edge, the frame base including a first channel and a second channel for partially enclosing a first lens and a second lens;
   a removable element including a first channel and a second channel, the removable element first and second channels being configured such that, when the removable element is attached to the frame base with the first lens received in the first channel of the frame base and with the second lens received in the second channel of the frame base, the removable element engages each of the first lens and the second lens, and the first and second channels of the frame base align with the first and second channels of the removable element to enclose a periphery of the first lens and a periphery of the second lens; and
   one or more attachment elements operative to removably attach the removable element to the frame base.

8. The modular eyeglass frame system of claim 7, wherein the removable element is a removable horizontal bar that extends across a width of the frame base to cover an upper portion of the periphery the first lens and an upper portion of the periphery of the second lens when the removable element is attached to the frame base with the first lens received in the first channel of the frame base and with the second lens received in the second channel of the frame base.

9. The modular eyeglass frame system of claim 7, wherein the first channel of the frame base has a width that is at least substantially equal to a width of the first channel of the removable element; and wherein the second channel of the frame base has a width that is at least substantially equal to a width of the second channel of the removable element.

10. The modular eyeglass frame system of claim 7, wherein the removable element has a top edge that substantially matches the top edge of the frame base such that the top edge of the removable element and the top edge of the frame base extend adjacent to one another when the removable element is attached to the frame base.

11. The modular eyeglass frame system of claim 7, wherein the removable element has a top edge that substantially matches the top edge of the frame base such that the top edge of the removable element and the top edge of the frame base are contiguous with one another when the removable element is attached to the frame base.

12. The modular eyeglass frame system of claim 7, wherein the removable element is positioned fully behind the top edge of the frame base when the removable element is attached to the frame base.

13. The modular eyeglass frame system of claim 7, wherein the one or more attachment elements are configured to attach the removable element to a back region of the frame base.

14. The modular eyeglass frame system of claim 7, wherein the removable element is at least substantially hidden from view from a front side of the frame base when the removable element is attached to the frame base.

15. The modular eyeglass frame system of claim 7, wherein the one or more attachment elements include a plurality of magnets disposed along each of the removable element and a top portion of the frame base.

16. The modular eyeglass frame system of claim 7, wherein the one or more attachment elements include one or more of a spring clip, a locking pin, a rubber nipple, and a snap-fit joint.

17. The modular eyeglass frame system of claim 7, wherein the one or more attachment elements are at least substantially hidden from view when the removable element is attached to the frame base.

18. The modular eyeglass frame system of claim 7, wherein the frame base is configured such that, when the first lens is received in the first channel of the frame base and the second lens is received in the second channel of the frame base with the removable element removed from the frame base, an upper portion of the periphery of the first lens and an upper portion of the periphery of the second lens are uncovered by the frame base.

19. The modular eyeglass frame system of claim 7, wherein the first channel of the frame base is configured to receive the first lens by sliding the first lens downward into the first channel of the frame base from the top edge of the frame base, and wherein the second channel of the frame base is configured to receive the second lens by sliding the second lens downward into the second channel of the frame base from the top edge of the frame base.

20. The modular eyeglass frame system of claim 7, further comprising the first lens and the second lens.

* * * * *

UNITED STATES PATENT AND TRADEMARK OFFICE
CERTIFICATE OF CORRECTION

| | |
|---|---|
| PATENT NO. | : 11,353,719 B2 |
| APPLICATION NO. | : 15/954514 |
| DATED | : June 7, 2022 |
| INVENTOR(S) | : Sean McGinley, Matt Proffitt and Michael Broz |

It is certified that error appears in the above-identified patent and that said Letters Patent is hereby corrected as shown below:

In the Claims

Claim 5, Column 9, Line 58, please insert --(i)-- before "the removing the third lens from the first channel…"

Signed and Sealed this
Nineteenth Day of July, 2022

Katherine Kelly Vidal
*Director of the United States Patent and Trademark Office*